United States Patent
Gohel et al.

(10) Patent No.: US 10,250,957 B2
(45) Date of Patent: Apr. 2, 2019

(54) DC-COUPLED SWITCHING IN AN AC-COUPLED ENVIRONMENT

(71) Applicant: Teradyne, Inc., North Reading, MA (US)

(72) Inventors: Tushar K. Gohel, Winchester, MA (US); Pavel Gilenberg, Needham, MA (US)

(73) Assignee: Teradyne, Inc., North Reading, MA (US)

(*) Notice: Subject to any disclaimer, the term of this patent is extended or adjusted under 35 U.S.C. 154(b) by 0 days.

(21) Appl. No.: 15/583,686

(22) Filed: May 1, 2017

(65) Prior Publication Data
US 2018/0316990 A1    Nov. 1, 2018

(51) Int. Cl.
| | | |
|---|---|---|
| *H04B 10/08* | (2006.01) | |
| *H04Q 11/00* | (2006.01) | |
| *H04B 10/073* | (2013.01) | |

(52) U.S. Cl.
CPC ..... *H04Q 11/0005* (2013.01); *H04B 10/0731* (2013.01); *H04Q 2011/0058* (2013.01)

(58) Field of Classification Search
CPC .. H04B 10/60; H04B 10/801; H04B 10/2507; H04B 10/58; H04B 10/611; H04B 10/613; H04B 10/0731; H04B 10/0775; H04B 10/07; H04Q 11/0005; H04Q 2011/0058; H04Q 2011/0083; G01J 1/44; G11B 20/10046; G11B 20/10212; G11B 7/1267
USPC ...... 398/45, 25, 208, 209, 162, 164, 33, 202
See application file for complete search history.

(56) References Cited

U.S. PATENT DOCUMENTS

| | | | | | |
|---|---|---|---|---|---|
| 3,750,036 | A | * | 7/1973 | Burrows | ........... G05B 21/02 327/336 |
| 3,902,132 | A | * | 8/1975 | Fried | ........... H03L 7/20 331/15 |
| 4,024,414 | A | * | 5/1977 | Gurry | ........... G01R 23/15 327/45 |

(Continued)

OTHER PUBLICATIONS

File History of U.S. Appl. No. 15/583,554, 69 pages (Retrieved Aug. 24, 2017).

(Continued)

*Primary Examiner* — Hibret A Woldekidan
(74) *Attorney, Agent, or Firm* — Choate, Hall & Stewart LLP

(57) ABSTRACT

An example system includes input circuitry configured to obtain first data corresponding to first signals on a communication channel, with the first data having a first frequency that is less than a predefined frequency; and sampling circuitry configured to sample the first data to produce second data having a second frequency that is greater than or equal to the predefined frequency. The example system also includes switching circuitry configured to support AC-coupled data having a frequency that is greater than or equal to the predefined frequency, with the switching circuitry being configured to receive the second data and to forward the second data; and output circuitry to receive the second data and parametric data representing non-information signal content, to produce third data based on the second data, and to produce, based on the third data and the parametric data, second signals for output from the system.

21 Claims, 5 Drawing Sheets

(56) References Cited

U.S. PATENT DOCUMENTS

| | | | | |
|---|---|---|---|---|
| 4,894,791 | A * | 1/1990 | Jiang | H03K 5/04 327/276 |
| 5,825,345 | A * | 10/1998 | Takahama | G06F 3/0412 345/104 |
| 6,172,534 | B1 * | 1/2001 | Brierley | G11B 7/005 327/58 |
| 6,288,578 | B1 * | 9/2001 | Katoh | G11C 19/285 327/276 |
| 7,212,747 | B2 * | 5/2007 | Niiho | H04B 10/25758 398/115 |
| 7,391,204 | B2 * | 6/2008 | Bicking | G01D 5/24476 324/207.21 |
| 8,086,100 | B2 * | 12/2011 | Aronson | G01M 11/00 398/135 |
| 8,878,590 | B2 * | 11/2014 | Slezak | H03K 19/017509 326/30 |
| 8,934,779 | B2 * | 1/2015 | Rope | H04B 17/101 398/136 |
| 9,240,774 | B2 * | 1/2016 | Gohel | H03K 5/01 |
| 2005/0264435 | A1 * | 12/2005 | Bicking | G01D 5/24476 341/15 |
| 2007/0026809 | A1 | 2/2007 | Zhang et al. | |
| 2009/0002075 | A1 * | 1/2009 | Chilakapati | H03F 3/20 330/297 |
| 2014/0132363 | A1 * | 5/2014 | Singerl | H03F 3/187 332/109 |
| 2018/0316420 | A1 * | 11/2018 | Gohel | H04B 10/0775 |
| 2018/0316421 | A1 * | 11/2018 | Gohel | H04B 10/0775 |
| 2018/0316423 | A1 * | 11/2018 | Gohel | H04B 10/07955 |
| 2018/0316424 | A1 * | 11/2018 | Gohel | H04B 10/07955 |

OTHER PUBLICATIONS

File History of U.S. Appl. No. 15/583,608, 73 pages (Retrieved Aug. 24, 2017).
File History of U.S. Appl. No. 15/583,630, 79 pages (Retrieved Aug. 24, 2017).
File History of U.S. Appl. No. 15/583,664, 84 pages (Retrieved Aug. 24, 2017).
Chan, K., TI Designs High Speed: Verified Design TSW3070EVM: Wide-Bandwidth and High-Voltage Arbitrary Waveform Generator Front Eng TI Designs High Speed Design Description, 28 pages (Sep. 1, 2013). URL: http://www.ti.com/lit/ug/tidu129/tidu129.pdf [Retrieved Jun. 22, 2018].
International Search Report for PCT/US2018/025654, 4 pages (Jul. 11, 2018).
Written Opinion for PCT/US2018/025654, 11 pages (Jul. 11, 2018).

* cited by examiner

DC-COUPLED SWITCHING IN AN AC-COUPLED ENVIRONMENT

TECHNICAL FIELD

This specification relates generally to communicating data transmitted at frequencies through a switch matrix that supports frequencies greater than a predefined frequency.

BACKGROUND

A signal includes informational content and characteristics other than informational content. For example, an optical signal may have an optical power level, which is a measure of the energy delivered by the optical signal per unit of time. In another example, an electrical signal may have a signal-to-noise ratio, which reflects the relative amounts of signal and noise in a transmission. These signal characteristics that do not represent the informational content of the signal are referred to as parametric information, and may be represented by data, called parametric data. The informational content of the signal may be represented by informational content data.

The informational content data and the parametric data may be transmissible at frequencies, or data rates, that are not supported by some circuit elements.

SUMMARY

An example system includes input circuitry configured to obtain first data corresponding to first signals on a communication channel, with the first data having a first frequency that is less than a predefined frequency; and sampling circuitry to sample the first data to produce second data having a second frequency that is greater than or equal to the predefined frequency. The example system also includes switching circuitry to support AC-coupled data having a frequency that is greater than or equal to the predefined frequency, with the switching circuitry being configured to receive the second data and to forward the second data; and output circuitry to receive the second data and parametric data representing non-information signal content, to produce third data based on the second data, and to produce, based on the third data and the parametric data, second signals for output from the system. The example system may include one or more of the following features, either alone or in combination.

The sampling circuitry may be configured to encode the first data at the second frequency to produce the second data. The output circuitry may be configured to decode the second data to produce the third data. The third data may have a third frequency that is less than the predefined frequency. The third frequency may be the same as the first frequency or have any other appropriate frequency.

The parametric data may represent non-informational signal content of the first signals. The sampling circuit may be configured to encode the parametric data at a third frequency that is greater than or equal to the predefined frequency to produce encoded parametric data. The switching circuit may be configured to receive the encoded parametric data, and to forward the encoded parametric data to the output circuitry. The output circuitry may be configured to decode the encoded parametric data to produce the parametric data. The parametric data may have a fourth frequency that is less than the predefined frequency.

The switching circuitry may comprise a first switch to receive the second data and to forward the second data to the output circuitry; and a second switch to receive the parametric data and to forward the parametric data to the output circuitry. The parametric data represents non-informational signal content of the first signals. The first switch and the second switch may be controllable independently. The output circuitry may comprise a selector circuit to receive the parametric data from a source other than the switching circuitry, and to select the parametric data for use by the output circuitry to produce the third data. The second signals may be based on, or identical to, the first signals both informationally and parametrically. The first frequency and the second frequency may be each non-zero AC frequencies. The first frequency is zero and the second frequency may each be a non-zero AC frequency.

An example method comprises obtaining first data corresponding to first signals on a communication channel, with the first data having a first frequency that is less than a predefined frequency; sampling the first data to produce second data having a second frequency that is greater than or equal to the predefined frequency; receiving, at switching circuitry, the second data and forwarding the second data, where the switching circuitry is configured to support AC-coupled data having a frequency that is greater than or equal to the predefined frequency; producing third data based on the second data; and producing second signals for output based on the third data and the parametric data. This example method may also include one or more of the foregoing features associated with the example system, as appropriate.

Any two or more of the features described in this specification, including in this summary section, can be combined to form implementations not specifically described herein.

The systems and techniques described herein, or portions thereof, can be implemented as/controlled by a computer program product that includes instructions that are stored on one or more non-transitory machine-readable storage media, and that are executable on one or more processing devices to control (e.g., coordinate) the operations described herein. The systems and techniques described herein, or portions thereof, can be implemented as an apparatus, method, or electronic system that can include one or more processing devices and memory to store executable instructions to implement various operations.

The details of one or more implementations are set forth in the accompanying drawings and the description below. Other features, objects, and advantages will be apparent from the description and drawings, and from the claims.

DETAILED DESCRIPTION

Figure 1:
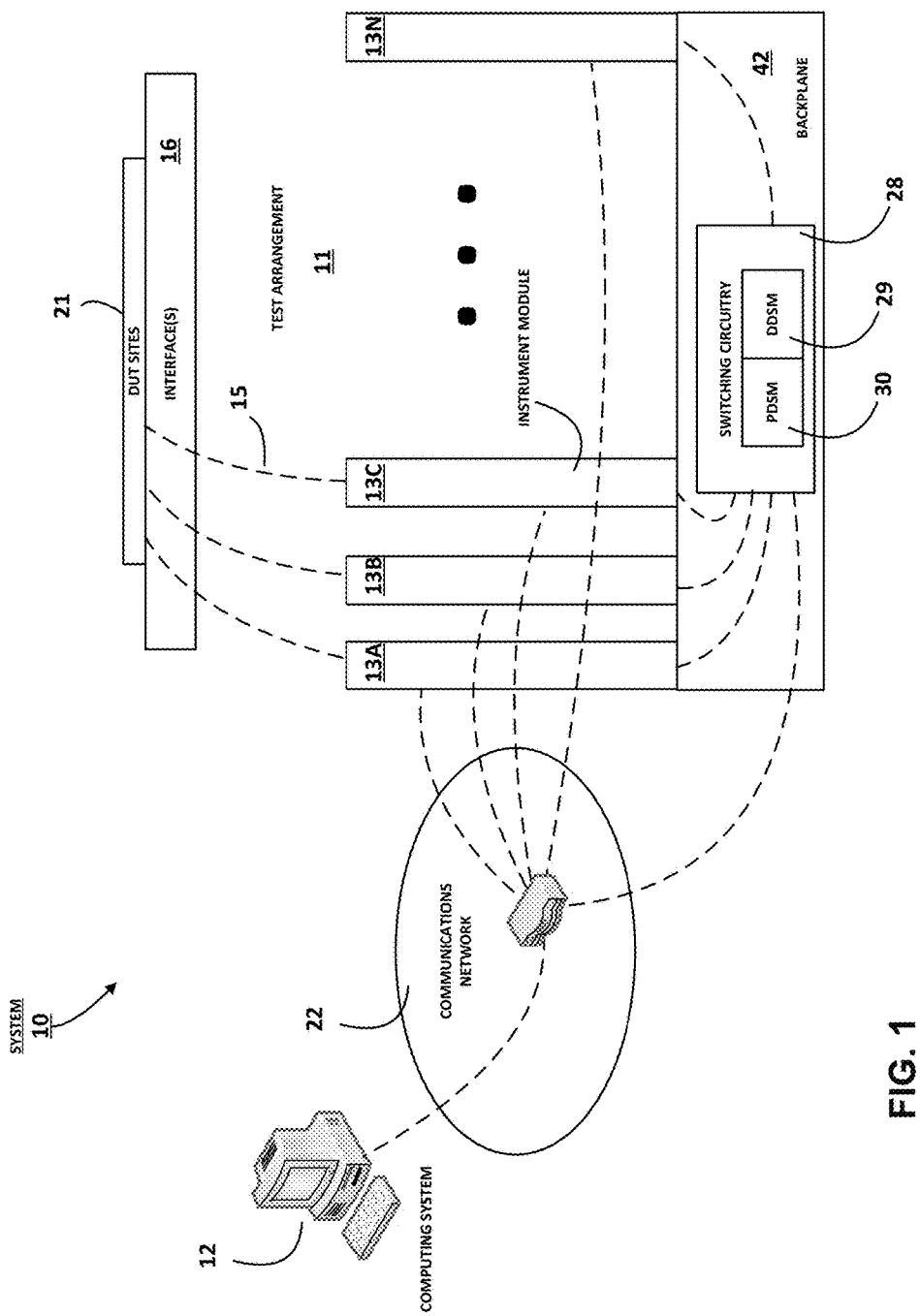
FIG. 1 is a block diagram of components of an example system that incorporates an implementation of the switch matrix system described herein.

Described herein are example systems that include multiple instrument modules. Each of the instrument modules is configured to communicate with one or more devices being tested by the system, and also to communicate with other instrument modules that are part of the system. A device being tested is referred to herein as a device under test (DUT) or a unit under test (UUT). Each instrument module is part of a communication (e.g., test) channel (or simply, "channel"), over which communications occur. The instrument modules communicate with each other over one or more transmission media on a backplane or other appropriate structure to which the instrument modules interface. For example, the instrument modules may communicate via one or more serial buses on the backplane or via an Ethernet-based network.

Switching circuitry, which may reside on the backplane or at another appropriate location in the system, directs communication data to and from different instrument modules/communication channels. The switching circuitry enables, among other things, any appropriate communication data to be transmitted from one channel to multiple channels (via their respective instrument modules), from multiple channels to one channel, or from one channel to another, different channel. The communication process may include replicating all or part of the communication data as closely as possible on one or more other channel(s), or processing the communication data and transmitting the resulting processed communication data, as appropriate. The communication process may also include substituting user-provided, or other, communication data for existing communication data, where appropriate.

The communication data may include data that represents both informational content and data that represents one or more signal characteristics other than informational content. Informational content includes the information being transmitted in a signal optically or electrically (e.g., a bit stream). Data that represents the informational content is referred to herein as informational content data. Data that represents one or more signal characteristics other than informational content is referred to herein as parametric data. For example, in some implementations, an instrument module may receive an input signal. The input signal may be optical or electrical; however, for illustration, an optical signal is received in this example. The optical signal may represent, for example, test data from a UUT or commands from a host computing system to control testing. The optical signal may be received over one or more optical fibers interfaced to, or otherwise in communication with, the system. The optical signal represents information, as indicated, but also has other characteristics. For example, the optical signal may have an optical power level, a signal-to-noise ratio, a modulation amplitude, an extinction ratio, a wavelength, a rise time, a fall time, a slew rate, or any other characteristic relating to a wave or the wave's shape. The instrument module receives the optical signal and converts the optical signal into an electrical (e.g., digital) signal comprising data representing the informational content of the optical signal (e.g., the test data, commands, etc.). The instrument module also captures the other characteristics—the parametric information—associated with the optical signal, and generates parametric data representing this parametric information. Both the informational content data and the parametric data may constitute the communication data referred to above, and may be transmitted among the instrument modules and associated communication channels.

As indicated above, the input signal may also be an electrical signal. The electrical signal may be a digital signal or an analog signal, for example. Electrical signals also have associated parametric information, such as signal-to-noise ratio, amplitude values, and so forth. Thus, an instrument module may receive an electrical signal—which may be analog or digital—generate a digital signal comprising informational content data representing the received electrical signal, and generate parametric data representing the parametric information associated with the electrical signal. The processing described herein for the resulting informational content data and parametric data is substantially the same regardless of whether the original input signal is optical or electrical. For this reason, the following addresses receipt of an optical signal only, with the understanding that the processing described applies equally in cases where the original input signal is electrical. Also, individual channels may contain more than one informational stream and, although the processing described herein relates to individual streams per channel, the processing described herein likewise applies to multiple streams per channel.

In some implementations, the switching circuitry comprises a first switching circuit and a second switching circuit. The first switching circuit is referred to as the signal switching circuit or the digital data switch matrix (DDSM), since this switching circuit provides, or distributes, to various instrument modules/communication channels, the informational content data representing the original signal. In some implementations, the DDSM is a single part that is a full cross-point switch and that is configured to operate on high-speed digital data. In an example, high-speed data may include data that is transmitted on the order of gigabits-per-second (Gb/s); however, the DDSM is not limited to use with such data transmission speeds. The DDSM may be configured to receive data on one channel's input and to reproduce that data on any number of desired outputs. In some implementations, the DDSM does not capture any data in memory; it simply makes a copy of the data on each desired output. In some implementations, the DDSM may store data in on-board memory. In some implementations, the DDSM has input buffers and re-drivers. In some implementations, either the PDSM or the DDSM is not used.

The second switching circuit is referred to as the parametric switching circuit or the parametric data switch matrix (PDSM), since this switching circuit provides, or distributes, to various instrument modules/communication channels, parametric data representing one or more signal characteristics other than informational content. In some implementations, the PDSM is a virtual switch matrix that enables high-speed serial communication of individual channels' parametric data transmitted among instrument modules in real-time. The system architecture supports parametric data of all appropriate types including, but not limited to, optical power levels, signal-to-noise ratio, modulation amplitude, extinction ratio, wavelength, rise time, fall time, slew rate, or any other characteristic relating to a wave or the wave's shape. In some implementations, the use of the PDSM is optional. In such implementations, a host computing system can simply select a desired output parameter (e.g., power level) for each channel and ignore the measured parameter at the input and received by the DDSM. The selected data can be transmitted to multiple channels simultaneously. In some implementations, the PDSM is configured to obtain parametric data from one or more instrument modules and is configured to transmit any module's port and channel parametric data to any other module's port and channel. This operation may be done on a continual basis as the data in question is changing. The PDSM may obtain parametric data from both input and output ports.

Some implementations may employ a different switch matrix configuration than that described here. For example, in some implementations, a single switch matrix may handle both the informational content data and the parametric data. For example, a single hardware switch may include both PDSM and DDSM functionality.

The DDSM and the PDSM may be configured, or controlled, to operate in parallel. For example, the DDSM may be configured to transmit informational content data at the same time as the PDSM transmits parametric data, and the PDSM may be configured to transmit parametric data at the same time as the DDSM transmits informational content data. In some implementations, the DDSM and the PDSM may be configured, or controlled, to operate independently or in concert to distribute their respective data to appropriate communication channels of the instrument module.

In an example operation, an example instrument module #1 may receive an input optical signal, convert that optical signal into informational content data (e.g., a digital signal) representing the informational content of the optical signal, and, during the conversion process, obtain parametric data representing the optical power of the optical signal (a non-informational characteristic of the optical signal). The informational content data and the parametric data may be sent over appropriate transmission media from the instrument module to the switching circuitry (e.g., the informational content data to the DDSM and the parametric data to the PDSM). The switching circuitry, in this example, may be configured, e.g., by a host computing system, to provide the informational content data to example instrument modules #2, #3, and #4, and to provide the parametric data to example instrument modules #4, #5, and #6. Instrument module #4 may use both the informational content data and the parametric data to replicate, on its output communication channel, the optical signal originally received by instrument module #1. That is, the optical signal output by instrument module #4 may be generated using the informational content data and the parametric data to have the same informational content and non-informational characteristics (e.g., optical power) as the optical signal received by instrument module #1. Instrument modules #2 and #3 may output an optical signal representing the informational content data and having any appropriate parametrics, the data for which may be stored in the respective instrument modules or received from elsewhere. Instrument modules #5 and #6 may use the received parametric data to generate optical signals having the same optical power as the optical signal received by instrument module #1. The informational content data used to generate the informational content of the optical signals output by instrument modules #5 and #6 may be obtained from any appropriate source. Other examples of functionalities available through the instrument modules are provided below.

In some implementations, the switching circuitry (e.g., the PDSM and/or DDSM) does not process data, but rather is only configurable to transmit data from one location to another location. In some implementations, the switching circuitry may include on-board intelligence that enables processing of the data prior to output from the switching circuitry. In any case, processing device(s) either on, or off, the backplane, may process the informational content data and/or the parametric data prior to distribution by the switching circuitry or following distribution by the switching circuitry. Processing may include, but is not limited to, changing the content of the data, changing a timing of the data, changing packet headers for the data, and so forth. Therefore, rather than providing the informational content data and the parametric data received, the switching circuitry may provide modified versions of that data to the various instrument modules/transmission channels. In some implementations, the switching circuitry may substitute designated informational content data and/or parametric data for different data, where the different data may be specified by a processing device, such as the host computing system, based on programmatic input.

FIG. 1 shows components of example system 10 that incorporates an example switch matrix system. Notably, however, the switching matrix system described herein is not limited to use in the context of testing or to use with the example system described herein, but rather may be used in any appropriate technical context, including outside of a testing environment. In FIG. 1, the dashed lines represent, conceptually, potential signal paths between components of the system. In this regard, in some implementations, the host computing system does not communicate directly with the instrument modules. Rather, there is a local bus handled by a field programmable gate array (FPGA) on the backplane that handles communication between the instrument modules and the host computing system. In some implementations, the FPGA that handles the communications is the same FPGA that implements the PDSM.

System 10 includes a test arrangement 11 and a host computing system 12. Test arrangement 11 may include interface(s) to one or more UUTs (not shown) on which tests are performed, and host computing system 12 communicates with components thereof to control testing. For example, host computing system 12 may download test program sets to instrument modules on the test arrangement, which then run the test program sets to test UUTs in communication with the test arrangement. Host computing system 12 may also send, to instrument modules in the test arrangement, instructions, test data, and/or other information that is usable by the corresponding instrument module to perform appropriate tests on a UUT interfaced to the test arrangement. In some implementations, this information may be sent via a computer network. Host computing system 12 may configure the DDSM and the PDSM based on user-provided, or other, programmatic inputs. The programming may specify switch configurations within the DDSM and the PDSM, or other appropriate operations or configurations. The DDSM and PDSM may be programmed and reprogrammed in real-time, as appropriate. In some implementations, the foregoing information may be sent via an optical network comprised of fiber optic lines that transmit optical signals between the instrument modules and the computer. Conversions between optical and electrical signals may be performed by the host computing system and by the respective instrument modules, as described herein. In some implementations, the foregoing information may be sent via a computer network, such as a local area network (LAN) or a wide area network (WAN).

In the example of FIG. 1, system 10 includes multiple instrument modules 13A to 13N, each of which may be configured, as appropriate, to perform one or more of the functions described herein. Although only four instrument modules are depicted, the system may include any appropriate number of instrument modules, including those residing outside of test arrangement 11. In some implementations, each instrument module may be configured to output test signals to test a UUT based, e.g., on data provided by the host computing system, and to receive signals from the UUT. Different instrument modules may be configured to perform different tests and/or configured to test different UUTs. The signals received may include response signals that are based on the test signals and/or signals that originate from the UUT that are not prompted by (e.g., are not in response to) test signals. In some implementations, there may be electrical connections between the UUT and the instrument modules, in which case the test data and response signals may be sent electrically. In some implementations, there may be optical connections between the UUT and the instrument modules, in which case the test data and response signals may be sent optically. In some implementations, there may be direct fiber optic lines/links between the UUTs and the instrument modules, over which optical signals are transmissible. In some implementations, there may be an optical network between the UUTs and the instrument modules, over which optical signals are transmissible. In some implementations, there may be a combination of optical and electrical transmission media between the instrument modules and the UUTs. In some instances the UUT may only interface with instrument modules through the DDSM or PDSM.

Each instrument module may include input circuitry (e.g., an interface card) for receiving signals from one or more UUTs or other appropriate signal source(s). Each instrument module may include output circuitry for outputting signals to a communication channel defined by the instrument module. In some implementations that employ optical communications, each instance of the input circuitry includes an interface circuit configured to receive an optical signal, configured to convert the optical signal to an electrical (e.g., a digital) signal comprising informational content data, configured to obtain parametric information about the optical signal before, during, or after the conversion process, and configured to obtain parametric data based on the information (e.g., to generate digital data representing the parametric information). In an example, the parametric information may be measured by the interface circuit and converted to digital data by the interface circuit or other appropriate logic. In some implementations, the interface circuit may be implemented using a device, such as an FPGA, an application-specific integrated circuit (ASIC), or other appropriate hardware.

In some implementations, one or more instrument modules include one or more optical interfaces that are designed to support 850 nanometers (nm) multi-mode optical communication from 1 Gb/s to 12 Gb/s or higher. In some implementations, other types of optical interfaces may be used, or no optical interfaces may be used.

Figure 2:
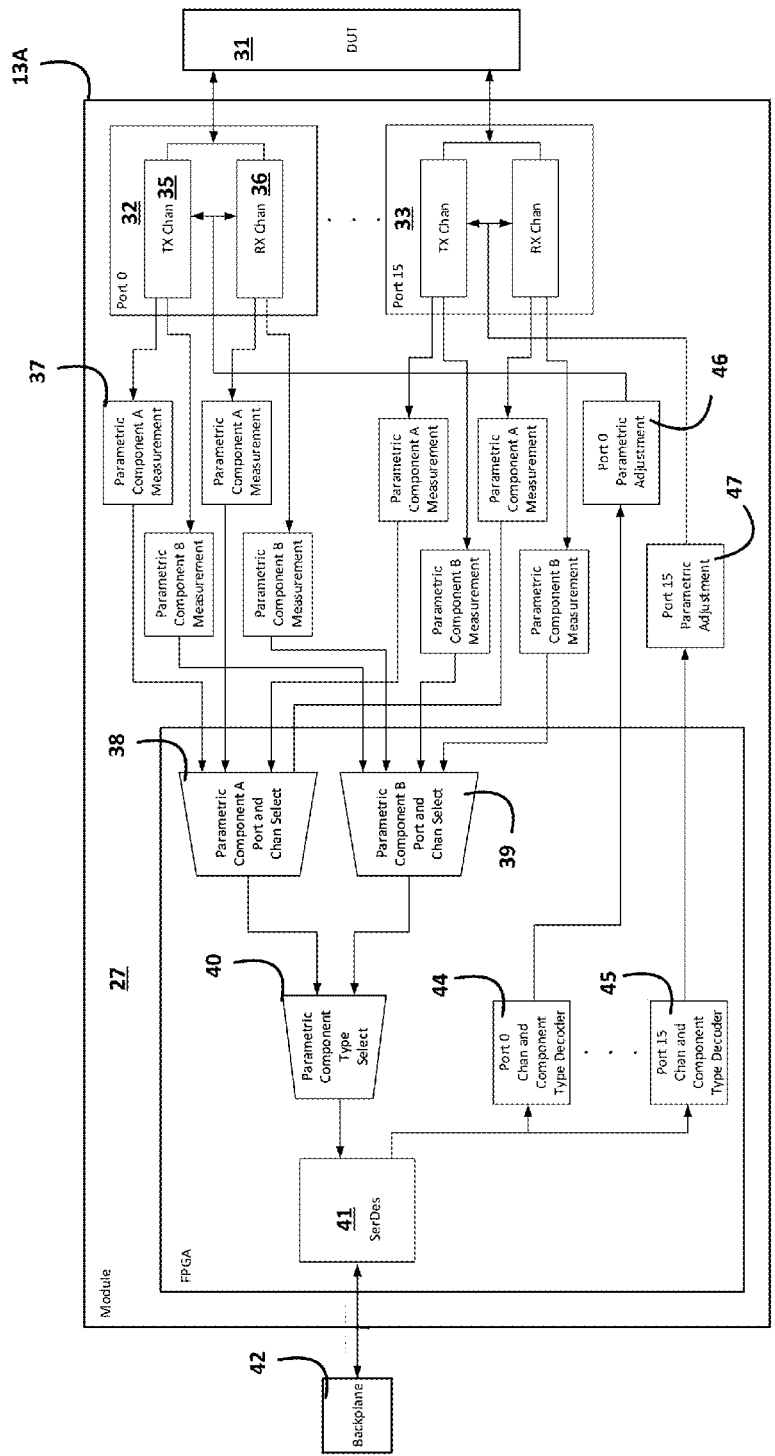
FIG. 2 is a block diagram of components of an example instrument module for transmitting parametric data from an instrument module to a backplane.

FIG. 2 shows an example implementation of circuitry 27 that may be included in an instrument module, such as 13A. In this example, instrument module 13A interfaces to a UUT 31 and exchanges test and response signals with that UUT. In this example instrument module 13A includes sixteen ports, of which two, 32 and 33, are shown. Each port includes a transmit channel ("TX Chan") 35 and a receive channel ("RX Chan") 36. The receive channel is part of the input circuitry, and is configured to receive signals from the UUT or elsewhere. The transmit channel is part of the instrument module's output circuitry, and is configured to output signals to the UUT or elsewhere. Circuitry 27 includes parametric measurement circuits, an example of which is 37. In this example, two parametric components, A and B (e.g., optical power and wavelength, respectively), are measured. Therefore, there is one corresponding parametric measurement circuit for each transmit and receive channel. That is, one parametric measurement circuit for a channel measures component A and one parametric measurement circuit for that channel measures component B. Parametric data representing those parametric components is sent from each channel to multiplexers 38 and 39—one for each parametric component, A and B. Multiplexers 38 and 39 each select data from channels designated, e.g., by the host computing system. Multiplexer 40 selects whether to provide parametric data for component A or for component B to the serial bus transmission circuit 41, which passes that data to backplane 42. Circuitry 27 also includes decoders—one for each channel, of which two, 44 and 45, are shown. These decoders transmit, to the input circuitry, information that is usable to adjust parametric data (via circuits 46 and 47) at the various ports.

Referring also to FIG. 1, the instrument modules may be interconnected through backplane 42 or any other appropriate electrical or mechanical mechanism. For example, instrument modules 13A to 13N may mechanically interface, e.g., plug into, backplane 42 of FIG. 1. Backplane 42 may include one or more transmission media over which communications pass among the various instrument modules. For example, the transmission media may be, or include, one or more serial buses such as a peripheral component interconnect express (PCIe) bus, Ethernet cable, or other appropriate media. In the case of a PCIe bus, the parametric data may be encapsulated in PCIe bus packet format and transmitted from instrument module logic (e.g., an FPGA) to the PDSM. In some implementations, different parametric data types may be stored in different packets. In some implementations, the PDSM decodes incoming PCIe bus packets and stores the decoded parametric data in data-type-specific random access memory (RAM), which may also reside on the backplane and which may be accessed by the instrument modules and the host computing system. Bus protocols other than PCIe and other types of encapsulation may be used.

Communications among the instrument modules pass through switching circuitry 28 which, as described herein, includes one or more programmable switching matrices (e.g., the PDSM and DDSM) in some implementations. Switching circuitry 28 is configurable to receive informational content data and parametric data, and to distribute the informational content data and parametric data among the instrument modules. As explained, informational content data received from an instrument module may be provided to one or more of the same communication channels, or to one or more different communication channels. Parametric data received from an instrument module may be provided to one or more of the same communication channels, or to one or more different communication channels. In some implementations, some of the informational content data may be sent to one set of channels, and some of the parametric data may be sent to another set of channels, with the first and second sets overlapping, at least in part. In some implementations, the informational content data and the parametric data may be sent to different numbers of channels or to the same number of channels. Basically, any routing that is appropriate may be implemented. In some implementations, instrument modules may receive data from the switching circuitry, manipulate that data, and send the data back to the switching circuitry. Example instrument module functionalities are described below.

In this regard, in some implementations, instrument modules in the system may vary in capabilities. In an example, an instrument module, such as instrument module 13A of FIG. 1, receives an input signal—which may be an optical signal or an electrical signal—and separates the input signal's data component (bit stream) from the input signal's parametric component. The system processes each component separately. The system also supports the testing of each signal's data and parametric components, as well as the retransmission of these components, e.g., to another instrument module through an appropriate switch. In some implementations, the system is configured so that, through appropriate programming, the bit stream on a channel may be reproduced on any other channel output, and that bit stream may have output parameters that can be specified programmatically in absolute terms or relative to one or more references, such as the parameters of another channel.

As explained, on some implementations, switching circuitry 28 may include a first switch (the DDSM 29) to handle distribution of the informational content data, and a second switch (the PDSM 30) to handle distribution of the parametric data. Each switch 29 and 30 may be programmable and/or under control of host computing system 12 in the manner described herein. In some implementations, as noted, each switch 29 and 30 may, or may not, have on-board intelligence that enables processing its respective data prior to output to the instrument modules/communication channels. In some implementations, the DDSM is implemented using a cross-point switch matrix; and, in some implementations, the PDSM is implemented using an FPGA. In some implementations, the DDSM is implemented using a cross-point switch matrix that receives and forwards data without performing any processing on the data; and, in some implementations, the PDSM is implemented using an FPGA that receives and forwards data and is also capable of performing processing on the data. However, hardware other than that described herein may be used to implement the DDSM and the PDSM. The DDSM and/or the PDSM may be capable of processing data.

Figure 3:
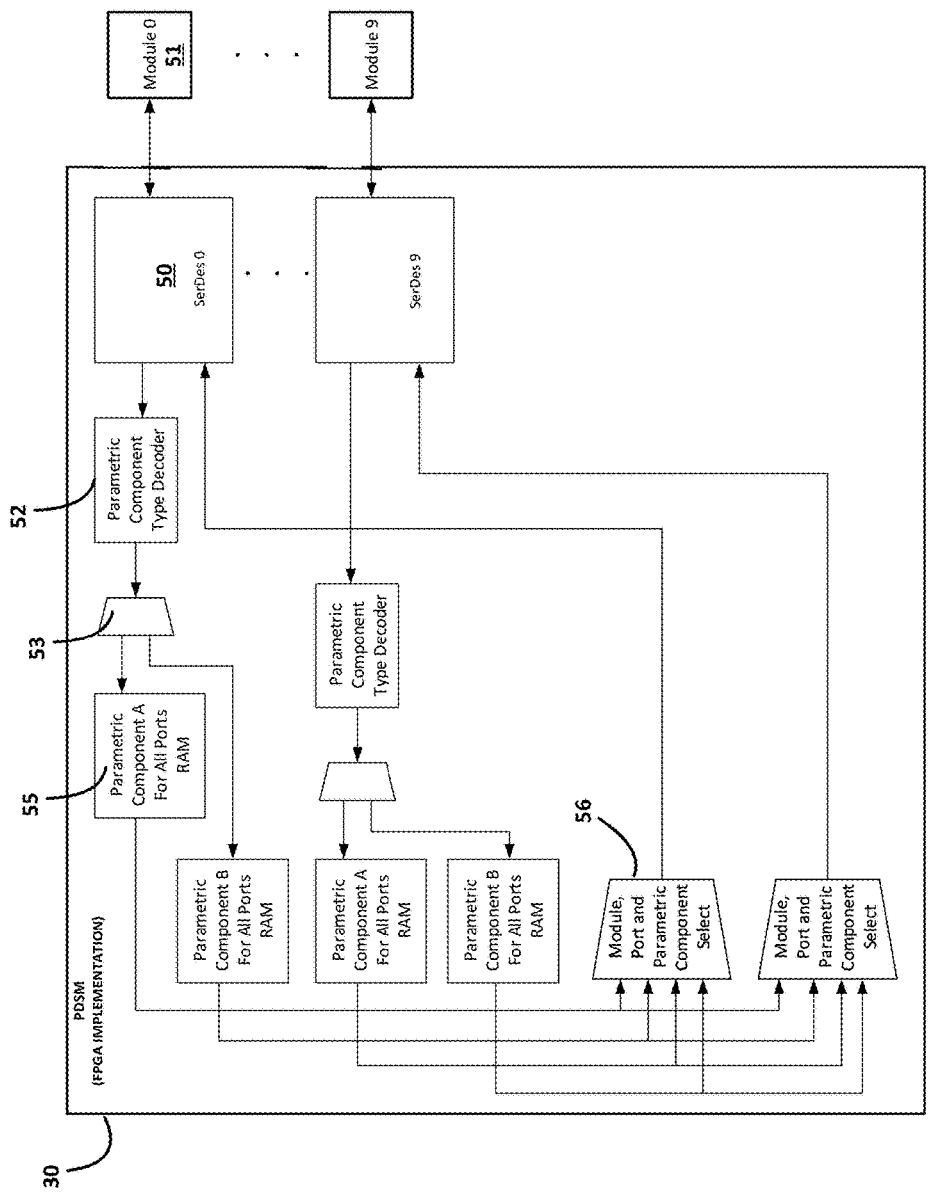
FIG. 3 is a block diagram of components of an example parametric data switch matrix that may be included in the example system.

An example implementation of PDSM 30 is shown in FIG. 3. PDSM 30 includes an input interface 50 for passing data received (RX) from an instrument module 51, and for passing data to be transmitted (TX) data to the instrument module. A decoder 52 (one for each RX channel) decodes parametric data passed as PCIe packets to the PDSM, and outputs parametric data to a input demultiplexer, an example of which is 53. Each input demultiplexer (e.g., 53) receives all parametric data components for the same input or output interface from all ports of the instrument module and outputs those parametric data components to parametric data RAM, an example of which is 55. That data is output from RAM, at an appropriate time, to one or more multiplexers, an example of which is 56. Control over the output may be implemented by a host computing system. The output multiplexer sends the parametric data, as appropriate, to a TX output for transmission to an instrument module or retransmission back to the switch. As shown, the PDSM is implemented using an FPGA in this example.

Referring back to FIG. 1, a separate processing device, which may or may not reside on the backplane, may perform processing before, during, or after distribution implemented by the switches. In some implementations, processing may be directed by, or under control of, host computing system 12, which is described below. In some implementations, the processing may be performed in the instrument modules. In some implementations, network 22 communicates through transmission media and logic on the backplane 42 with instrument the modules.

In some implementations, host computing system 12 communicates with the instrument modules via the backplane over a network 22, which may be an appropriate Ethernet-based communication network, an appropriate optical network, a wireless network, or some combination thereof. Thus, in some implementations, network 22 may be, or include one or more optical networks, including fiber optic links between the host computing system and the instrument modules In some implementations, network 22 may be, or include, a LAN, wide area network (WAN), or a combination thereof. In some implementations, network 22 may be, or include, a combined optical and electrical network between the host computing system and instrument modules.

In the example of FIG. 1, system 10 also includes one or more interfaces 16 that connects, optically, electrically and/or mechanically, to components of test arrangement 11, such as the instrument modules. The interface(s) each define one or more sites 21, which may include pins, traces, or other points of electrical, optical, and/or mechanical connection to which one or more UUTs may connect—e.g., one UUT per site. Test signals, response signals, and other information pass over the sites between the UUT and instrument modules 13A to 13N. Connections between the instrument modules and the UUTs may be optical, electrical, or a combination thereof. In some implementations, each instrument module may include a separate interface, e.g., an optical interface, that connects, through optical transmission media, directly to a UUT.

In an example implementation, the system supports up to ten modules—each having sixteen channel inputs and sixteen channel outputs—that plug into a backplane, such as backplane 42. Other implementations, however, may have different numbers of modules, channels, ports, and the like. The backplane includes hardware to implement the switch matrix functionality described herein (e.g., the switching performed by the DDSM and the PDSM). As described, the example system may be configured to capture all information about a signal at an input and to reproduce that same signal at the output. This includes the informational content data component as well as parametric components, such as the power levels, waveform, and the like.

In an example, the switching circuitry may be configured to connect a signal from one channel to another channel, and to preserve the power level of the signal on that other channel. In an example operation, the DDSM passes data for that signal to the other channel/instrument module. The PDSM provides the instrument module that controls the output signal with the measured power levels of the input channel. The instrument module then produces a signal having the informational content of the informational content data and having the power level represented by the parametric data. The same concepts can be used for margin testing. For example, a user may want to emulate an optical fiber having a 2 decibel (dB) loss. The user can program the output of an instrument module to always produce a signal having an output power level that is 2 dB less than a power level measured at its input. The system also supports adding gain, e.g., programming the output of an instrument module to always produce a signal having an output power level that is 2 dB greater than the power level measured at an input.

In some implementations, the host computing system can configure the PDSM so that parametric data from any appropriate port and channel can be sent to any other appropriate port and channel. The host computing system can also program the system so that parametric data is not sent to any given port or channel on a per channel basis. After a configuration is defined, the PDSM may send parametric data encapsulated in PCIe packet format to all designated instrument modules, ports, and channels. In some implementations, the configuration can be modified in real-time.

In some implementations, each instrument module may be configured to implement functions to support the PDSM. A first example function includes continually measuring the parametric data of ports and channels of the instrument module. A second example function includes obtaining all of the parametric data measurements for input signal(s) and sorting those parametric data measurements into types— e.g., into parametric components A and B of FIG. 2. Once sorted, the parametric data measurements are encapsulated in PCIe formatted packets and sent to the backplane over an appropriate serial bus. A third example function includes receiving, per port and per channel, parametric data from the backplane and applying the individualized parametric data to the corresponding port and channel within the instrument module.

In some implementations, the PDSM on the backplane, on an ongoing basis, receives and decodes high-speed serial data from each of the instrument modules connected to the backplane, or a subset thereof. The PDSM multiplexes the received data serially back to the appropriate module(s).

In some implementations, an active control loop between communication channels is configured to stabilize and to provide an optical signal having desired parametric characteristics. For example, in some implementations, the active control loop may be a power control loop to provide an output optical signal having a stable, and defined, optical power level. Notably, however, the active control loop is not limited to providing an optical signal having power characteristics. Rather, the active control loop may be configured to provide an output optical signal having any one or more parametric characteristics including, but not limited to, a specified optical power, signal-to-noise ratio, modulation amplitude, extinction ratio, wavelength, rise time, fall time, slew rate, or any other characteristic relating to a wave or the wave's shape.

Figure 4:
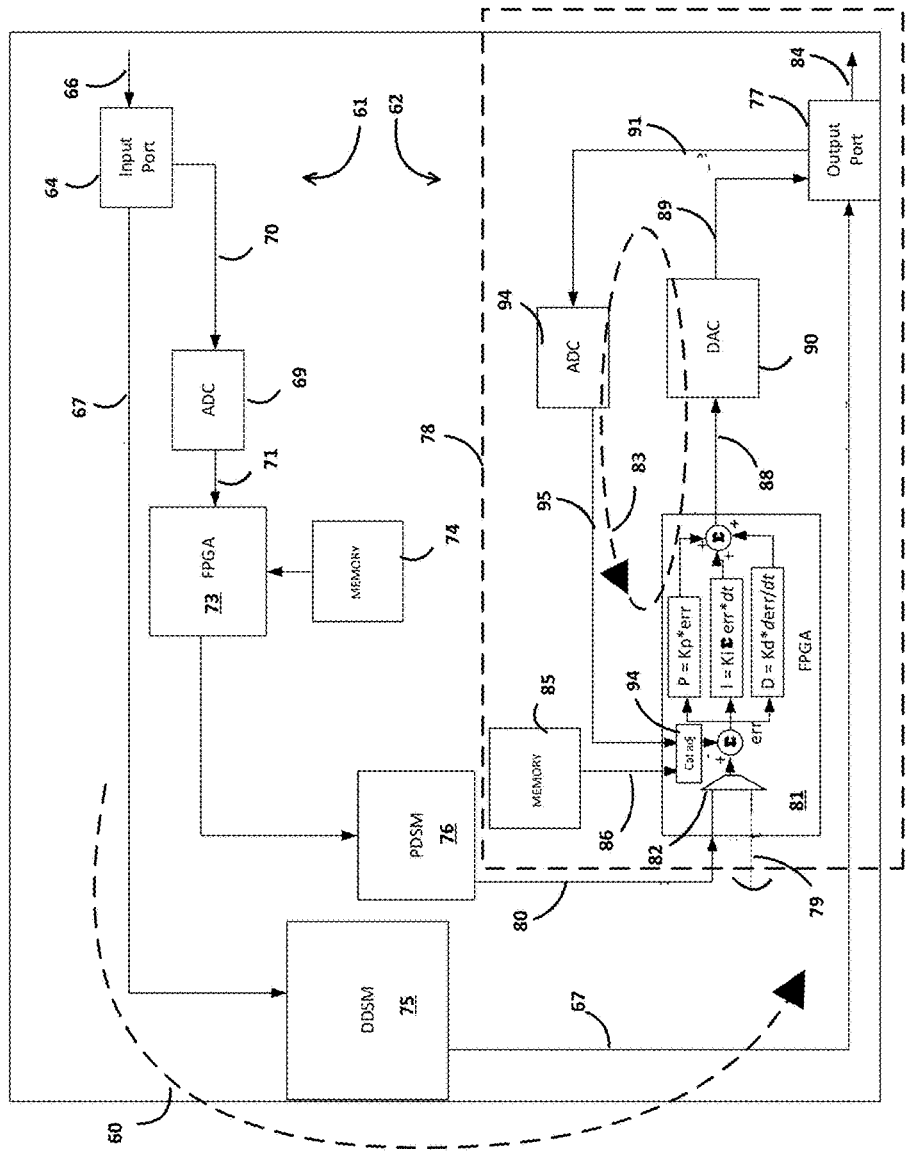
FIG. 4 is a block diagram showing an example of an active control loop for controlling parametric information on channels.

FIG. 4 shows an example implementation of an active control loop 60 for controlling parametric data transfers between two communication channels. In some implementations, the active control loop may be configured to stabilize parametric data at the output (e.g., to eliminate or reduce spikes or noise in the parametric data) Active control loop 60 is a represented conceptually by a dashed curve having an arrow that shows an example direction of control/data flow.

FIG. 4 shows only two example communication channels; however, the active control loop described herein may be implemented among more than two communication channels, as appropriate. The communication channels may include an input channel 61 and an output channel 62, although the channels may be two input channels or two output channels, as described below. In some implementations, the input channel includes circuitry configured to receive an optical signal, to convert the optical signal to an electrical (e.g., a digital) signal, to obtain parametric information about the optical signal before, during, or after the conversion process, and to obtain parametric data based on the information (e.g., to generate digital data representing the parametric information). In an example, the parametric information may be measured by an interface circuit and converted to digital data by the interface circuit or other appropriate logic. In some implementations the output channel includes circuitry configured to receive an electrical (e.g., a digital) signal, to convert the electrical signal to an optical signal, to obtain parametric information about the optical signal before, during, or after the conversion process, and to obtain parametric data based on the information (e.g., to generate digital data representing the parametric information). In an example, the parametric information may be measured by an interface circuit and converted to digital data by the interface circuit or other appropriate logic.

In the example of FIG. 4, channel 61 includes an optical input port 64 comprising an interface configured to receive an optical signal 66, and to generate informational content data 67 representing the informational content of the optical signal. Input port 66 is also configured to measure parametric information for the optical signal, such as, but not limited to, optical power level, signal-to-noise ratio, modulation amplitude, extinction ratio, wavelength, rise time, fall time, slew rate, or any other characteristic relating to a wave or the wave's shape. In this example, the parametric information represents the optical power level of the optical signal; however, as noted, the parametric information may represent any appropriate parametric characteristic of the optical signal. In this example, channel 61 also includes an analog-to-digital converter (ADC) 69. ADC 69 receives the measured parametric information 70, and converts that information into digital data; that is, parametric data 71. Thus, the input port and ADC capture the parametric data, and forward that parametric data to multiplexers of the type shown in FIG. 2 (e.g., 38, 39, 40) on programmable logic, such as an FPGA 73.

In the example of FIG. 4, memory 74 stores calibration data, e.g., parameter values, that may be used to calibrate the parametric data. The calibration data may be specific to the input port, and may be used to correct for errors produced by the input port. For example, the input port may include a photodiode. The photodiode may have physical or optical characteristics that cause it to operate in a way other than expected, particularly at different temperatures, resulting in parametric information (and, thus, parametric data) containing an error component. Calibration may be performed to correct for errors other than errors produced by the photodiode. The calibration data may be applied to the parametric data via logic in the FPGA to correct for this error component. An example of error correction of parametric data is described below with respect to output channel 62.

As described above with respect to FIGS. 2 and 3, DDSM 75 transmits informational content data between channels 61 and 62, and PDSM 76 transmits parametric data between channels 61 and 62. As shown in FIG. 4, DDSM 75 transmits the informational content data to output port 77. PDSM 76 transmits the parametric data 80 to output circuitry 78, which is located on a path of the output channel. In an example, the parametric data may be, or may be based on, the parametric data that was obtained from the optical signal at channel 61. In some implementations, the parametric data may be independent of the parametric data for channel 61 and may be provided to output circuitry 78 from a source unrelated to channel 61. For example, parametric data 79 may be programmed into the system, e.g., by the host computing system, and may be provided to the output circuitry from there. Such parametric data may be defined by a user to control the target parameter(s) (e.g., optical power level) of the output signal. In some implementations, parametric circuitry other than the PDSM described herein or the hardware used to provide the programmatic inputs may be used.

In the example of FIG. 4, output circuitry 78 includes programmable logic 81, which may be an FPGA or other appropriate programmable device. In some implementations, the functionality implemented therein described below may be implemented using discrete logic components, an ASIC, or other appropriate circuitry.

Output circuitry 78 includes a selector circuit 82, such a multiplexer, to select between the parametric data 80 provided by PDSM 76 or the parametric data 79 provided via programmatic (or other) input. Selection may be controlled by one or more processing devices that are either on, or off, the backplane. For example, selection may be controlled by the host computing system of FIG. 1 or using input(s) from the host computing system. The selected parametric data is the parametric data that is usable by the output circuitry to produce an optical signal having the informational content of the informational content data 67 and the parametric characteristics of the selected parametric data (either parametric data based on parametric data obtained from channel 61 or parametric data otherwise specified, e.g., programmatically).

In the example of FIG. 4, the output circuitry includes an error correction loop 83 to calibrate, e.g., to correct, for errors introduced by hardware in the output port or elsewhere, such as a photodiode. Error correction loop 83 is a feedback loop represented conceptually by a dashed ellipse having an arrow that shows the direction of feedback. In some implementations, however, this internal error correction loop may be omitted. In example implementations like this, the selected parametric data and the informational content data are both provided directly to the output port 77. The output port then generates an optical signal 84 having the informational content of the informational content data and the parametric characteristics of the selected parametric data.

The example of FIG. 4, however, includes error correction loop 83. In this example, the error correction loop comprises a proportional, integral, derivative control loop configured to calculate an error value ("err") of the output optical signal based as a difference between a target output parametric characteristic (e.g., a predefined optical power) and a measured parametric characteristic (e.g., a measured optical power), and to apply a correction to the output optical signal based on that error. For example, memory 85 may store calibration data (e.g., parameter values) that are usable to correct for hardware, or other, errors in the output circuitry, such as photodiode-introduced errors in output port 77. The selected parametric data and the calibration data 86 are summed via an adder ("Σ"), and the resulting error ("err") applied to proportional (P), integral (I), and derivative (D) components. Each of these components produces an output, which are summed via another adder ("Σ"). The resulting sum 88 constitutes control data that, in this example, is converted into an analog signal 89 by digital-to-analog controller (DAC) 90. This analog signal is a corrected parametric control voltage that is used by the output port to produce the optical signal having parametric characteristics reflecting the selected parametric data as corrected for any errors introduced by signal-generating hardware or other factors, such as temperature.

The error control loop incorporates output port 77. In some implementations, optical output port 77 may comprise an interface configured to receive an electrical signal (informational content data 67), to receive a signal representing the selected parametric data as corrected, and to generate an optical signal 84 representing the informational content of the electrical signal and having parametric characteristics based on the selected parametric data. In some implementations, output port 77 is also configured to measure parametric information for the output optical signal, such as, but not limited to, optical power level, signal-to-noise ratio, modulation amplitude, extinction ratio, wavelength, rise time, fall time, slew rate, or any other characteristic relating to a wave or the wave's shape. In this example, the measured parametric information 91 represents the optical power level of the optical signal; however, as noted, the parametric information may represent any appropriate parametric characteristic of the optical signal. In this example, channel 62 also includes an analog-to-digital converter (ADC) 94. ADC 94 receives the measured parametric information 91, and converts that information into digital data 95; that is, parametric data. Thus, output port 77 and ADC 94 capture the parametric data, and forward that measured parametric data as an input 94 of the error correction loop 83.

Input 94 receives the measured parametric data 95 and adjusts the measured parametric data based on the calibration data 86 received from memory 85. The result is then combined with the selected parametric data to produce an error ("err") value, and the process described above is repeated to continually correct for error in the output signal relative to a target output. In some implementations, error correction of this type may be used to stabilize output power, and to smooth-out spikes or noise in output power that may be present in the parametric data.

In the example of FIG. 4, the active control loop described is described with respect to an input port 64 and an output port 77. However, the active control loop may be used with any two or more ports to communication channels. For example, the active control loop may be used to control the parametric characteristics of one channel (input or output channel) based on the parametric characteristics of any one other channel (input or output channel). In some implementations, multiple active control loops may be used to control the parametric characteristics of multiple channels (input or output channel) based on the parametric characteristics of any one other channel (input or output channel). In some implementations, multiple active control loops may be used to control the parametric characteristics of one channel (input or output channel) based on the parametric characteristics of multiple other channels (input or output channel). For example, a single channel may produce a signal having the optical power of one channel and the wavelength of another, different channel using two active control loops encompassing the single channel and the two other channels.

In some implementations, the active control loops may be used to implement margin testing, as described herein. For example, a user may specify programmatically that the output power levels are always −5 dBm in one application. In another application, the user may specify programmatically that the output power level should always be 2 dB less than the power on another channel. These example power characteristics may be controlled by providing, and selecting, appropriate parametric data, as described above.

In some implementations, all or part of the switching circuitry is configured to support AC (alternating current)-coupled data having a frequency that is greater than or equal to one or more minimum predefined frequencies. For example, all or part of the switching circuitry may be configured to operate with AC data only, and not to operate with direct current (DC) data. In some implementations, the DDSM may be configured to operate only with AC data having a frequency greater than a minimum predefined frequency. In some implementations, the PDSM may be configured to operate only with AC data having a frequency greater than a minimum predefined frequency. In some implementations, both the DDSM and the PDSM may be configured to operate only with AC data having a frequency greater than a minimum predefined frequency. The minimum frequencies at which the DDSM and/or the PDSM may operate may be the same or different frequencies, and may have any appropriate value(s).

Circuitry is described herein to enable use of the switching circuitry, and thus the system, with data having frequencies lower than the minimum frequency supported by the switching circuitry. For example, signals may be received on a communication channel. The signals may be optical or electrical. The signals may be received by input circuitry which obtains, from the signals, both informational content data representing the informational content of those signals and parametric data representing the non-informational signal content of the signals. The informational content data and/or the parametric data may each have an original frequency that is less than the minimum frequency supported by the switching circuitry. Accordingly, the system includes circuitry to encode the informational content data and/or the parametric data so that each has a frequency that is greater than or equal to the minimum predefined frequency supported by the switching circuitry. In some implementations, the original frequency and the frequency produced through sampling are both non-zero AC frequencies. In some implementations, the original frequency is zero (e.g., the original signal may be a DC signal), and the frequency produced through sampling is a non-zero AC frequency.

Figure 5:
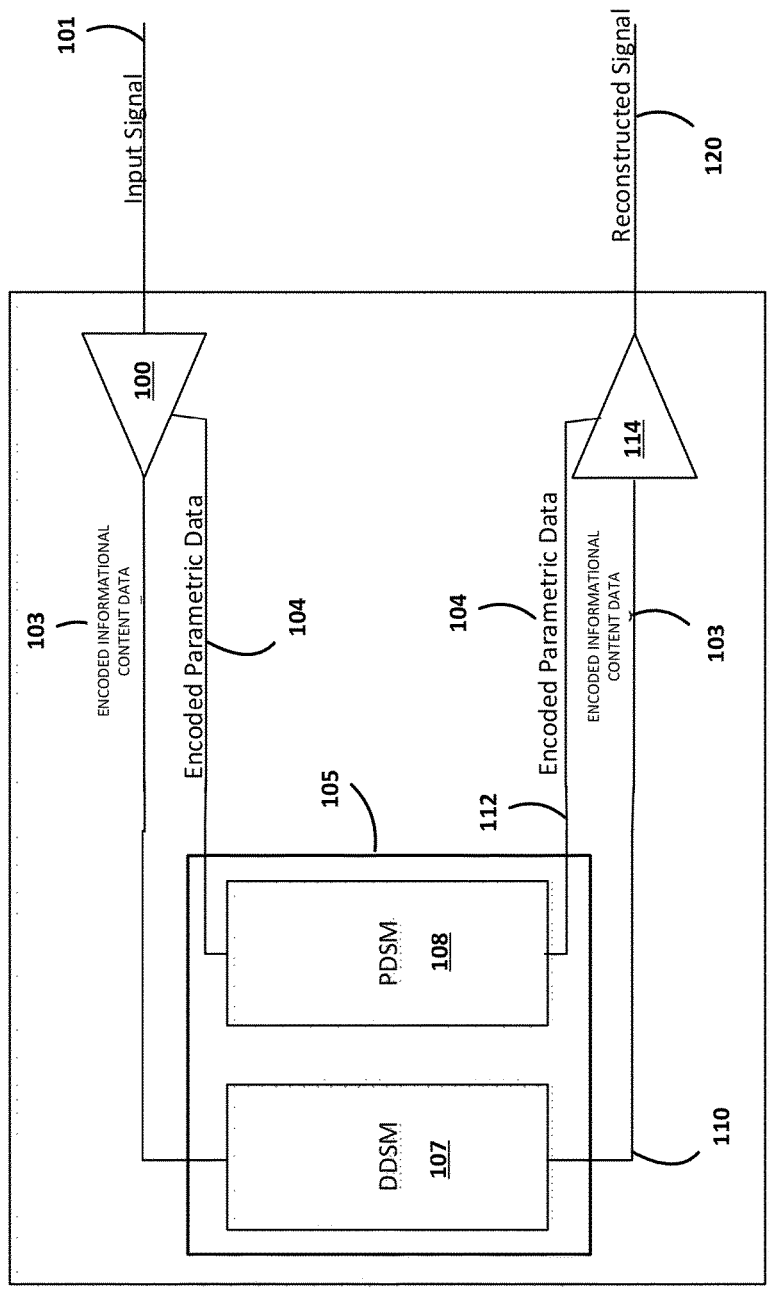
FIG. 5 is a block diagram showing, conceptually, examples of circuit components for adjusting frequencies of signals.

FIG. 5 shows an example implementation of the circuitry described above. In this example, the circuitry includes circuitry 100 configured to obtain data corresponding to input optical or electrical signals (e.g., an "input signal") on communication channel 101. In some implementations, the circuitry is configured to convert the input signals to informational content data. In some implementations, the circuitry is configured to receive, from communication channel 101, informational content data having the frequency (or data rate) that is less than the minimum predefined frequency. Referring to FIG. 4, in some implementations, circuitry 100 may include all, or part of, input port 64, FPGA 73, and/or ADC 69 for performing the receiving and/or converting functions; however, in other implementations circuitry 100 may include different input circuitry.

In some implementations, circuitry 100 also includes sampling circuitry. In the example of FIG. 5, the sampling circuitry is configured to sample the obtained informational content data and parametric data to produce encoded informational content data 103 and encoded parametric data 104. In some implementations, the sampling circuitry may be configured to sample the informational content data to produce encoded informational content data only, or to sample the parametric data to produce encoded parametric data only. In some implementations, the parametric data changes slowly, so it is encoded in the system. In some implementations, the parametric data is sampled at a relatively low data rate and transferred at a relatively high data rate. In the example of FIG. 5, the encoded informational content data 103 and the encoded parametric data 104 each have a frequency that is greater than or equal to the minimum predefined frequency (e.g., at least as great as the frequency) supported by the switching circuitry. In some implementations, the frequency of the encoded informational content data 103 is the same as the frequency of the encoded parametric data 104. In some implementations, the frequency of the encoded informational content data 103 is different from the frequency of the encoded parametric data 104. In some implementations, the frequency of the encoded informational content data 103 is greater than the frequency of the encoded parametric data 104. In some implementations, the frequency of the encoded informational content data 103 is less than the frequency of the encoded parametric data 104. Referring to FIG. 4, in some implementations, the sampling performed by circuitry 100 may be performed by input port 64, ADC 69, and FPGA 73. For example, input port 64 may be configured to sample the original input signal to produce the encoded informational content data, and ADC 69 and/or FPGA may be configured to sample parametric data of the original input signal to produce the encoded parametric data. In some implementations, input port 64 may be configured to sample parametric data of the original input signal to produce the encoded parametric data.

In the example of FIG. 5, switching circuitry 105 includes DDSM 107 and PDSM 108. However, as explained elsewhere herein, in some implementations, the switching circuitry may include circuit components other than, or in addition to, the DDSM and the PDSM. In the example of FIG. 5, the DDSM is configured to receive, and to route, the encoded informational content data 103 in the manner described herein. For example, the DDSM is configured to forward the encoded informational content data 103 on a path 110 to communication channel 120 (the output communication channel in this example). In the example of FIG. 5, the PDSM is configured to receive, and to route, the encoded parametric data 104 in the manner described herein. For example, the PDSM is configured to forward the encoded parametric data on a path 112 to communication channel 120. In some implementations, the encoded informational content data is transmitted through the path to the switching circuit at a frequency greater than or equal to the frequency supported by the path and/or the switch.

In the example of FIG. 5, both the encoded parametric data and the encoded informational content data are forwarded to output circuitry 114, and are used by output circuitry 114 to produce the reconstructed signal. In some implementations, output circuitry 114 may have the configuration of output circuitry 78 of FIG. 4. In some implementations, output circuitry 114 may have a different configuration than that described herein. Referring to FIG. 4, the encoded informational content data may be represented by reference 67 and the encoded parametric data may be represented by reference 80. As described with respect to FIG. 4, a selector circuit 82, such a multiplexer, is configured to select between the encoded parametric data 80 provided by the PDSM or the parametric data 79 provided via programmatic (or other) input. Selection may be controlled by one or more processing devices that are either on, or off, the backplane. For example, selection may be controlled by the host computing system of FIG. 1 or using input(s) from the host computing system. The selected parametric data is the parametric data that is usable by the output circuitry 114 to produce an output optical (or electrical) signal having the informational content of the informational content data 67 and the parametric characteristics of the selected parametric data (either parametric data based on parametric data from the PDSM or parametric data otherwise specified, e.g., programmatically).

In the example of FIG. 5, and as described with respect to FIG. 4, the output circuitry may be controlled to produce a "reconstructed signal" on channel 120 based on the encoded informational content data and the encoded parametric data. For example, output circuitry 114 may decode both the encoded informational content data and the encoded parametric data, which may result in informational content data and parametric data having the frequencies that are less than the minimum predefined frequency supported by the switching circuitry. This may be because the components used in the communication or the switching circuitry itself is AC-coupled. In some implementations, the frequency of the resulting informational content data is the same as the frequency of the resulting parametric data. In some implementations, the frequency of the resulting informational content data different from the frequency of the resulting parametric data. In some implementations, the frequency of the resulting informational content data is greater than the frequency of the resulting parametric data. In some implementations, the frequency of the resulting informational content data is less than the frequency of the resulting parametric data. In some implementations, decoding may be performed by output port 84, FPGA 81, and/or DAC 90. For example, in some implementations, output port 77 may be configured to decode the encoded parametric data and to decode the encoded informational content data. In some implementations, FPGA 81 and/or DAC 90 may be configured to decode the encoded parametric data to produce the resulting parametric data.

In some implementations, the reconstructed signal is the same, both informationally and parametrically, as the original input signal on communication channel 101. That is, the informational content data is used to replicate the informational content of that original input signal, and the parametric data is used to replicate the non-informational content of that original input signal. As described herein, in some implementations, the reconstructed signal may be formed using the informational content data of the original input signal and other (e.g., programmed) selected parametric data, resulting in a reconstructed single having the same informational content as the original input signal, but different parametrics. In some implementations, as described herein, the reconstructed signal may be formed using informational content data obtained from a communication channel other than communication channel 101, and using parametric data from communication channel 101. As a result, the reconstructed signal may have information content different from that of the original input signal, but parametrics that are the same as the parametrics of the original input signal (decoded from the encoded parametric data 104).

In some implementations, the DDSM may support a minimum data rate of 1 Mb/s (megabit-per-second). A UUT may, however, require low-speed applications from DC to 1 kb/s (kilobits-per-second), for example. In this example, the system may encode the input signal at a data rate that is supported by the DDSM, and may transfer the encoded digital signal to the DDSM. That data is then decoded to reconstruct the original input signal on the output channel. The parametric data can also be encoded, transmitted, and used to reconstruct the parametric components of the signal as described herein.

In some implementations of the circuitry described herein, multiple optical transmission media (e.g., multiple optical fibers) may be used to provide at least informational content to a single electrical transmission medium (e.g., a wire). In some implementations of the circuitry described herein, multiple optical transmission media may be used to receive at least informational content from a single electrical transmission medium. In some implementations of the circuitry described herein, multiple electrical transmission media (e.g., multiple wires) may be used provide at least informational content to a single optical transmission medium (e.g., an optical fiber). In some implementations of the circuitry described herein, multiple electrical transmission media may be used to receive at least informational content from a single optical transmission medium. In some implementations of the circuitry described herein, the same circuitry may include one or more optical transmission media and one or more electrical transmission media to provide at least informational content to a single electrical transmission medium. In some implementations of the circuitry described herein, the same circuitry may include one or more optical transmission media and one or more electrical transmission media to receive at least informational content from a single electrical transmission medium. In some implementations of the circuitry described herein, the same circuitry may include one or more optical transmission media and one or more electrical transmission media to provide at least informational content to a single optical transmission medium. In some implementations of the circuitry described herein, the same circuitry may include one or more optical transmission media and one or more electrical transmission media to receive at least informational content from a single optical transmission medium.

In the examples described herein, processing of data is performed in the electrical domain. However, in some implementations, all or part of the processing maybe be performed in the optical domain using appropriate optical circuitry.

The system and features described herein may be implemented as, or be part of, automatic test equipment (ATE). ATE refers to an automated, usually computer-driven, system for testing devices. ATE typically includes a computer system, such as that shown in FIG. 1, and one or more instrument modules (e.g., as shown in FIG. 1) or a single device having corresponding functionality. In an example operation, in response to instructions in a test program set (TPS), some ATE automatically generates input signals to be applied to a UUT, and monitors output signals from the UUT. In some implementations, pin electronics in the ATE compares the received output signals with expected responses (e.g., threshold) to determine whether the UUT is defective or has passed a test. In an example, an instrument module outputs voltage and/or current to the UUT, and receives voltage and/or current from the UUT. For example, in some implementations, ATE may be capable of forcing voltage to a UUT and sourcing current to the UUT. In some implementations, the ATE is capable of providing test signals to a UUT, receiving response signals from the UUT, and forwarding those response signals for processing to determine whether the UUT meets testing qualifications. Signals are transmitted between the ATE and the UUT over the communication channels described herein. The test and response signals may be processed as described herein, e.g., to identify their informational and parametric content, to distribution data representing the informational and parametric content, and so forth.

In some implementations, test signals may be sent over multiple channels and test results may be based on response signals received from multiple channels. In some implementations, test signals may be sent over a single channel and test results may be based on response signals received from a single channel. In some implementations, test signals may be sent over a multiple channels and test results may be based on response signals received from a single channel. In some implementations, test signals may be sent over a single channel and test results may be based on response signals received from multiple channels. The circuitry described herein may be programmed, e.g., by a user at a host computing system or a test program set to send test signals over, and receive response signals from, a single channel or multiple channels as desired.

In general, the circuitry described herein for generating optical signals for output may include any appropriate device, such as one or more lasers or light-emitting diode(s) (LEDs) or a vertical-cavity surface-emitting laser (VCSEL).

Testing performed using the example systems described herein may be implemented using hardware or a combination of hardware and software. For example, a system like the ones described herein may include various controllers and/or processing devices located at various points in the system to control operation of the automated elements. A central computer may coordinate operation among the various controllers or processing devices. The central computer, controllers, and processing devices may execute various software routines to effect control and coordination of the various automated elements.

The techniques described herein may be performed by systems or any other appropriate computing device. The techniques can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the testing can be performed by one or more programmable processors executing one or more computer programs to perform the functions described herein. All or part of the testing can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any "electrical connection" or "optical connection" as used herein may imply a direct physical connection or a wired or wireless connection that includes or does not include intervening components but that nevertheless allows signals to flow between connected components. Any "connection" involving electrical circuitry or optical components mentioned herein that allows signals to flow between two points, unless stated otherwise, is not necessarily a direct physical connection regardless of whether the word "electrical" or "optical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A system comprising:
input circuitry to obtain first data corresponding to first signals on a communication channel, the first data having a first frequency that is less than a predefined frequency;
sampling circuitry to sample the first data to produce second data having a second frequency that is greater than or equal to the predefined frequency;
switching circuitry to support AC-coupled data having a frequency that is greater than or equal to the predefined frequency, the switching circuitry being configured to receive the second data and to forward the second data; and
output circuitry to receive the second data and parametric data representing non-information signal content, to produce third data based on the second data, and to produce, based on the third data and the parametric data, second signals for output from the system.

2. The system of claim 1, wherein the sampling circuitry is configured to encode the first data at the second frequency to produce the second data; and
wherein the output circuitry is configured to decode the second data to produce the third data.

3. The system of claim 2, wherein the third data has a third frequency that is less than the predefined frequency.

4. The system of claim 3, wherein the third frequency is the same as the first frequency.

5. The system of claim 1, wherein the parametric data represents non-informational signal content of the first signals;
wherein the sampling circuit is configured to encode the parametric data at a third frequency that is greater than or equal to the predefined frequency to produce encoded parametric data;
wherein the switching circuit is configured to receive the encoded parametric data, and to forward the encoded parametric data to the output circuitry; and
wherein the output circuitry is configured to decode the encoded parametric data to produce the parametric data, the parametric data having a fourth frequency that is less than the predefined frequency.

6. The system of claim 1, wherein the switching circuitry comprises:
a first switch to receive the second data and to forward the second data to the output circuitry; and
a second switch to receive the parametric data and to forward the parametric data to the output circuitry, the parametric data representing non-informational signal content of the first signals.

7. The system of claim 6, wherein the first switch and the second switch are controllable independently.

8. The system of claim 1, wherein the switching circuitry comprises a first switch to receive the second data and to forward the second data to the output circuitry; and
wherein the output circuitry comprises a selector circuit to receive the parametric data from a source other than the switching circuitry, and to select the parametric data for use by the output circuitry to produce the third data.

9. The system of claim 1, wherein the second signals are identical to the first signals both informationally and parametrically.

10. The system of claim 1, wherein the first frequency and the second frequency are each non-zero AC frequencies.

11. The system of claim 1, wherein the first frequency is zero and the second frequency is a non-zero AC frequency.

12. A method comprising:
obtaining first data at an instrument module device of a test system, the first data corresponding to first signals on a communication channel, the first data having a first frequency that is less than a predefined frequency;
sampling the first data at the instrument module device to produce second data having a second frequency that is greater than or equal to the predefined frequency;
receiving, at switching circuitry of the test system, the second data and forwarding the second data, the switching circuitry being configured to support AC-coupled data having a frequency that is greater than or equal to the predefined frequency;
producing third data at the instrument module device based on the second data; and
producing, based on the third data and parametric data, second signals for output by the instrument module device for testing a unit under test.

13. The method of claim 12, wherein sampling comprises encoding the first data at the second frequency to produce the second data; and
wherein producing the third data comprises decoding the second data.

14. The method of claim 13, wherein the third data has a third frequency that is less than the predefined frequency.

15. The method of claim 14, wherein the third frequency is the same as the first frequency.

16. The method of claim 12, wherein the parametric data represents non-informational signal content of the first signals;
wherein sampling comprises encoding the parametric data at a third frequency that is greater than or equal to the predefined frequency to produce encoded parametric data;
wherein the switching circuit receives the encoded parametric data, and forwards the encoded parametric data to output circuitry; and
wherein the method comprises decoding the encoded parametric data to produce the parametric data, the parametric data having a fourth frequency that is less than the predefined frequency.

17. The method of claim 12, wherein the switching circuitry comprises:
a first switch to receive the second data and to forward the second data to output circuitry; and
a second switch to receive the parametric data and to forward the parametric data to the output circuitry, the parametric data representing non-informational signal content of the first signals.

18. The method of claim 17, wherein the first switch and the second switch are controlled independently.

19. The method of claim 12, wherein the second signals are based on the first signals both informationally and parametrically.

20. The method of claim 12, wherein the first frequency and the second frequency are each non-zero AC frequencies.

21. The method of claim 12, wherein the first frequency is zero and the second frequency is a non-zero AC frequency.

* * * * *